(12) United States Patent
Sakoda et al.

(10) Patent No.: US 6,702,471 B2
(45) Date of Patent: Mar. 9, 2004

(54) RADIAL ROLLER BEARING

(75) Inventors: Hironari Sakoda, Kanagawa (JP);
Shinichi Natsumeda, Kanagawa (JP);
Takashi Murai, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/287,702

(22) Filed: Nov. 5, 2002

(65) Prior Publication Data
US 2003/0091255 A1 May 15, 2003

(30) Foreign Application Priority Data
Nov. 6, 2001 (JP) .................................... P. 2001-340906

(51) Int. Cl.$^7$ .............................................. F16C 33/34
(52) U.S. Cl. ........................ 384/450; 384/564; 384/565
(58) Field of Search ................................. 384/450, 565, 384/564, 566, 567

(56) References Cited

U.S. PATENT DOCUMENTS 6,086,261 A * 7/2000 Nakagawa et al. ......... 384/565
6,530,693 B1 * 3/2003 Ijuin et al. .................. 384/450

\* cited by examiner

*Primary Examiner*—Lenard A. Footland
(74) *Attorney, Agent, or Firm*—Sughrue Mion, PLLC

(57) ABSTRACT

A radial roller bearing has: an outer ring; an inner ring; and, a cylindrical roller interposed between the outer ring and the inner ring, the outer and inner rings respectively including flange portions formed in the end portions thereof so as to be opposed to the end face of the cylindrical roller, wherein, in the end face of the cylindrical roller, there is formed a circular-ring-shaped contact portion of the roller end having centers of curvature continuously existing on a circle which lies on a plane parallel to the end face of the cylindrical roller and also the center of the circle is on the rotation axis of the cylindrical roller.

5 Claims, 6 Drawing Sheets

RADIAL ROLLER BEARING

BACKGROUND OF THE INVENTION

The present invention relates to a radial roller bearing and, in particular, to a radial roller bearing of a type that, in the end portion of a ring, there is formed a flange portion to be slidingly contactable with the end face of a cylindrical roller.

In a radial roller bearing using a cylindrical roller as a rolling element, in the end portion of a ring, there is formed a flange portion; that is, the end face of the cylindrical roller is slidingly contacted with the present flange portion to thereby control the attitude of the cylindrical roller when it is skewed, or guide the cylindrical roller in the circumferential direction of the ring, or support an axial load applied to the cylindrical roller.

In the radial roller bearing of this type, in case where only the radial load acts on the cylindrical roller and no skew moment occurs in the cylindrical roller, there is raised no problem even when the end face of the cylindrical roller is formed in a straight shape. However, in case where an axial load acts on the cylindrical roller and skew moment or a tilt angle occurs in the cylindrical roller, since the axial load is supported by the contact portion between the cylindrical roller and flange portion, an edge load is generated in the end portion of the contact portion. Due to this edge load, there is applied excessively large surface pressure onto the end portion of the contact portion, with the result that seizure and wear are easy to occur in the end portion of the contact portion. On this account, in a case of that a roller bearing is used under a condition that a certain level of axial load is applied thereon, a tapered roller bearing is chosen in many case. However, the tapered roller bearing needs to adjust the axial clearance between the cup and the cone, which determines the radial clearance and the bearing performances. So, when assembling the bearing into a housing, there is a need to locate the axial position of the cup and the cone precisely. On the other hand, when using cylindrical roller bearing, there is no need to locate the axial position precisely. So, it is very easy to assemble the bearing. The reason why, in case of that the cylindrical roller bearing is used instead of the tapered bearing, it is improved a convenience of assembling. If the axial load capacity of the cylindrical roller bearing is improved, the cylindrical roller bearing ban be used, instead of the tapered roller bearing, under a certain level of axial load. Thus in order to reduce the edge load applied to the cylindrical roller bearing under a certain level of axial load is applied thereon, as shown in FIG. 9, there is known a radial roller bearing in which the end face 13a of a cylindrical roller 13 to be contacted with a flange portion 14 is formed in a spherical shape having a given radius of curvature η.

However, in the radial roller bearing in which the end face of a cylindrical roller is formed in a spherical shape, since the center of the radius of curvature η lies on its rotation axis 13b of the cylindrical roller 13, as shown in FIG. 10, the contact portion 15 of the cylindrical roller with the flange portion 14 provides almost a circular shape. For this reason, in case where the radius of curvature η increases as the opening angle δ of the flange portion 14 decreases, the diameter of the contact portion 15 also increases and thus the contact portion 15 swells out of the flange portion 14, so that an edge load is easy to occur.

SUMMARY OF THE INVENTION

The present invention aims at eliminating the above-mentioned drawbacks found in the conventional radial roller bearing. Accordingly, it is an object of the invention to provide a radial roller bearing which can restrict occurrence of an edge load in the contact portion between the cylindrical roller and flange portion to thereby be able to enhance the seizure resistance and wear resistance of the contact portion.

In attaining the above object, according to the invention, there is provided a radial roller bearing, comprising: an outer ring; an inner ring; and, a cylindrical roller interposed between the inner ring and the outer ring, the outer and inner rings respectively including flange portions formed in the end portions thereof so as to be opposed to the end face of the cylindrical roller, wherein, in the end face of the cylindrical roller, there is formed a circular-ring-shaped contact portion of the roller end having centers of curvature continuously existing on a circle which lies on a plane parallel to the end face of the cylindrical roller and also the center of the circle is on the rotation axis of the cylindrical roller.

According to the present structure, the contact portions between the above-mentioned contact portion of the roller end formed in the end face of the cylindrical roller and the above-mentioned flange portions each provide an elliptical shape which is narrow in the radial direction and long along the circumferential direction of the flange portion; that is, the elliptical-shaped contact portion is difficult to run off from the flange portion. This can restrict occurrence of an edge load in the contact portion between the cylindrical roller and flange portion, which makes it possible to enhance the seizure resistance and wear resistance of the radial roller bearing.

Now, where the diameter of the cylindrical roller is expressed as Da and the distance from the center of curvature of the contact portion of the roller end to the rotation axis of the cylindrical roller along the radial direction of the cylindrical roller is expressed as ξ, in the case of ξ<0.1 Da, an edge load occurs, so that the surface pressure applied to the end portion of the contact portion is larger than the surface pressure applied to the central portion of the contact portion, thereby facilitating the occurrence of seizure. In the case of ξ>0.4 Da, an oil film is difficult to be formed in the contact surface to thereby increase the rate of metal contact between the cylindrical roller and flange portion. Therefore, preferably, the distance ξ from the center of curvature of the contact portion of the roller end to the rotation axis of the cylindrical roller along the radial direction of the cylindrical roller may be set such that ξ=0.1 Da to 0.4 Da.

Also, where the radius of curvature of the contact portion of the roller end is expressed as η, in the case of η<2.0 Da, the film thickness ratio (which is also referred to as an oil film parameter) of the contact portion between the contact portion of the roller end and flange portion is equal to or less than the limit value and thus a rate of metal contact increases. The oil film parameter consists of oil film thickness and composite roughness. The oil film thickness is calculated by EHL theory (Elasto-Hydrodinamic Lubrication Theory). And the composite roughness is calculated with each surface roughness. In the case of η>20.0 Da, the contact portion between the contact portion of the roller end and flange portion swells out of the flange portion, so that an edge load is generated. Therefore, preferably, the radius of curvature η may be set such that η=2 Da to 20 Da.

Further, in case where the distance from the center of curvature of the contact portion of the roller end to the rotation axis of the cylindrical roller along the radial direction of the cylindrical roller ξ is approximately 0.3 Da, when the composite roughness σ of the contact portion (that is, the roughness that is composed ($\sigma=\sqrt{(\sigma_1^2+\sigma_2^2)}$) of the surface roughness of the contact portion of the roller end ($\sigma_1$) and the surface roughness of the flange portion ($\sigma_2$)) exceeds 0.6 μm, formation of an oil film is very difficult. In the case of ξ=0.1 Da or so, when the composite roughness σ of the contact portion exceeds 1 μm, the oil film parameter is equal to or less than 1, formation of the oil film is very difficult. Therefore, preferably, the composite roughness σ of the contact portion may be set such that σ≦−10.4 (ξ/Da)$^2$+2.2 (ξ/Da)+0.9.

DETAILED DESCRIPTION OF THE PREFERRED EMBODIMENTS

Now, description will be given below of an embodiment of a radial roller bearing according to the invention with reference to the accompanying drawings.

Figure 1:
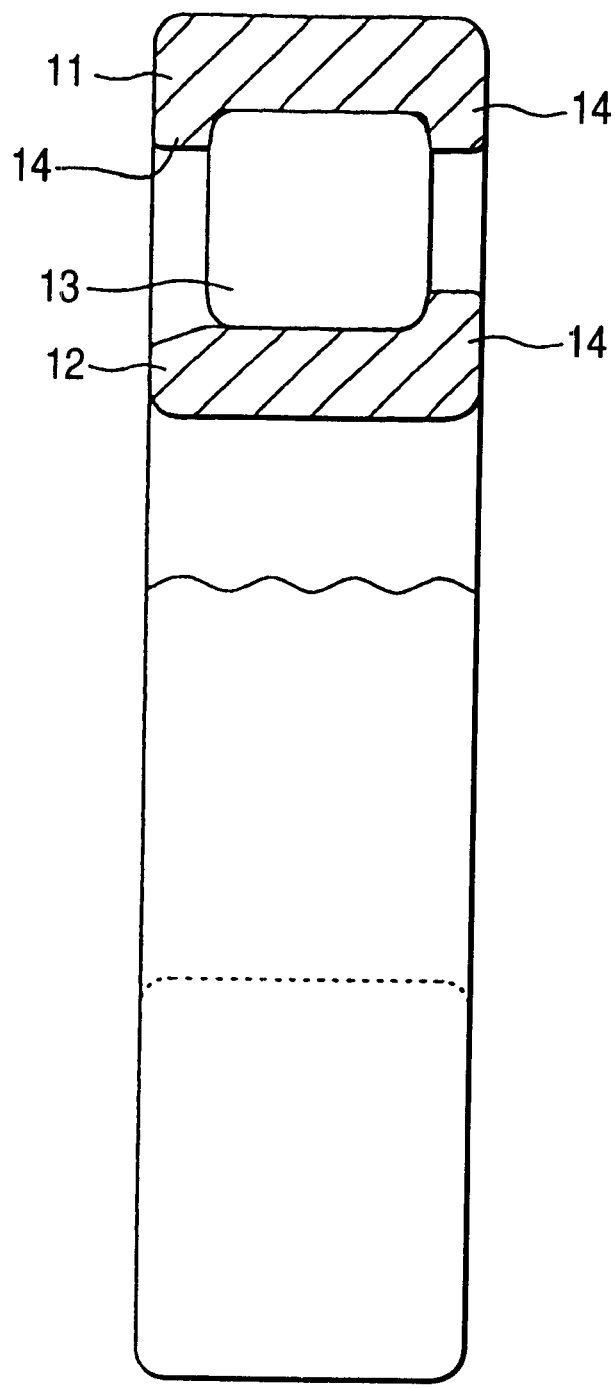
FIG. 1 is a partially sectional view of an embodiment of a radial roller bearing according to the invention.
Figure 2:
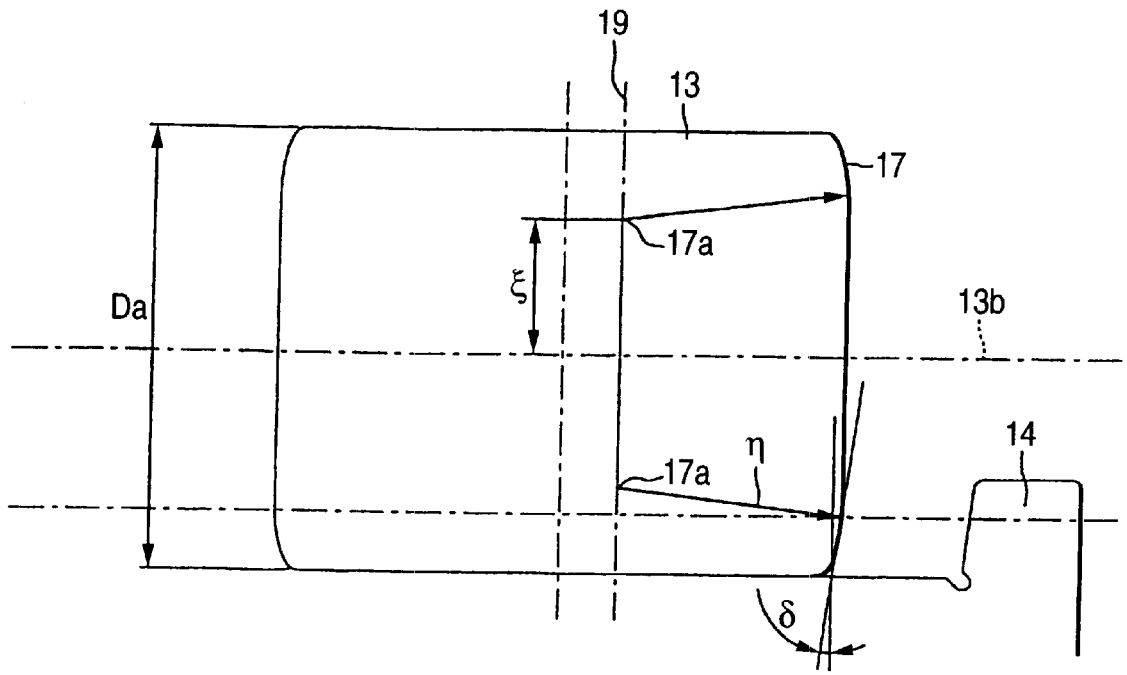
FIG. 2 is an enlarged view of a portion of FIG. 1.

FIG. 1 is a partially sectional view of a radial roller bearing according to an embodiment (which is hereinafter referred to as the present embodiment) of the invention, and FIG. 2 is an enlarged view of a portion of FIG. 1. As shown in FIG. 1, a radial roller bearing according to the present embodiment comprises an outer ring 11, an inner ring 12 and a cylindrical roller 13.

The outer ring 11 and inner ring 12 are respectively formed in a ring shape and, in the end portions of these rings 11, 12, there are respectively formed flange portions 14 each having an opening angle δ of the order of 0.0835° (5 arc minutes) to 3°. The flange portions 14 are respectively disposed so as to be opposed to the end face of the cylindrical roller 13. In the end face of the cylindrical roller 13, there is formed a circular-ring-shaped contact portion of the roller end (a curved portion) 17 (see FIGS. 2 and 3) which is to be contacted with the flange portions 14.

The contact portion of the roller end 17, as shown in FIG. 2, has centers of curvature 17a. These centers of curvature 17a are formed continuously on a circle which lies on a plane 19 parallel to the end face of the cylindrical roller 13 and also the center of which is the rotation axis 13b of the cylindrical roller 13. Where the diameter of the cylindrical roller 13 is expressed as Da, the distance ξ from the respective centers of curvature 17a of the contact portion of the roller end 17 to the rotation axis (center axis) of the cylindrical roller 13 can be found such that ξ=0.1 Da to 0.4 Da. Also, where the diameter of the cylindrical roller 13 is expressed as Da, the contact portion of the roller end 17 is formed in a circular ring having a radius of curvature η in the range of 2.0 Da to 20.0 Da.

Figure 3:
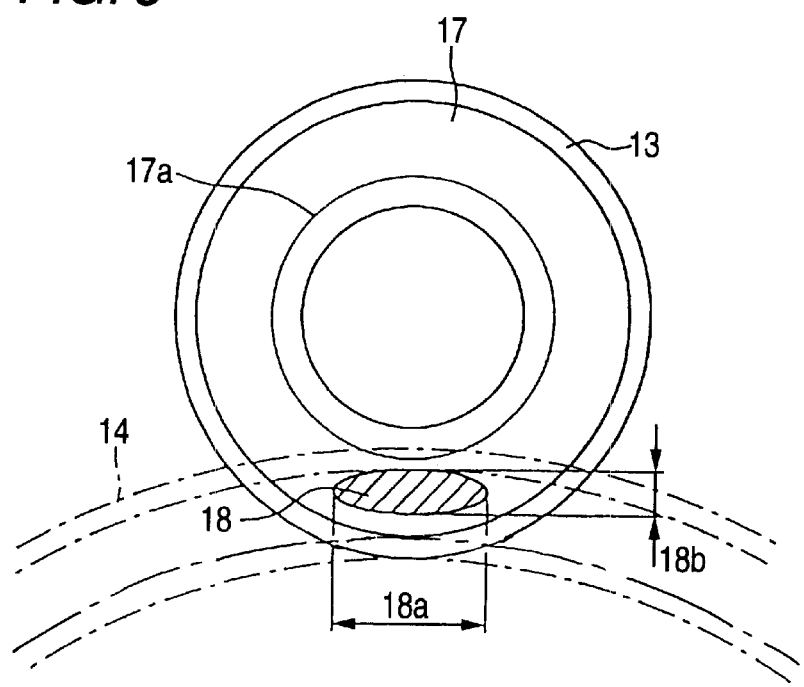
FIG. 3 is a view of the contact portion of FIG. 2 where a cylindrical roller and a flange portion are contacted with each other.

In this manner, in case where the radius of curvature η of the contact portion of the roller end 17 formed in the end face of the cylindrical roller 13 is set such that η in the range of 2.0 Da to 20.0 Da and also the distance ξ from the respective centers of curvature 17a of the contact portion of the roller end 17 to the rotation axis of the cylindrical roller 13 along the radial direction is set such that ξ=0.1 Da to 0.4 Da, as shown in FIG. 3, the contact portion (in FIG. 3, the oblique line portion) between the contact portion of the roller end 17 and flange portion 14 provides a long and narrow elliptical shape in the peripheral direction of the flange portion. Therefore, when compared with a contact portion which is circular of prior art, the present contact portion is difficult to run off of the flange portion 14.

Figure 4:
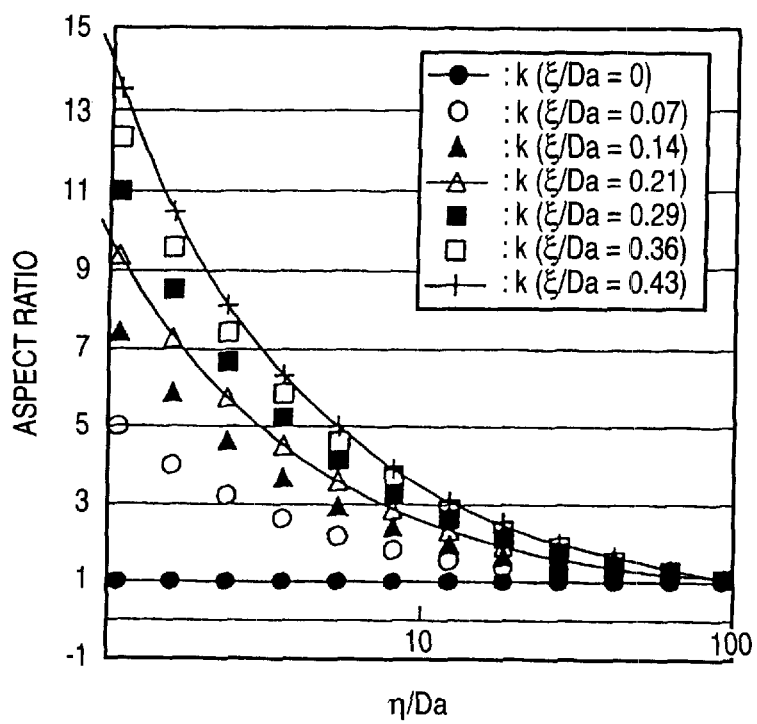
FIG. 4 is a graphical representation of the relationship between the aspect ratio and ξ/Da of the contact portion.

Here, in case where the distance is set such that ξ<0.1 Da, as shown in FIG. 4, even when the radius of curvature η increases, the aspect ratio of the contact portion 18 (a ratio of the circumferential-direction contact width 18a to the radial-direction contact width 18b) does not increase so much; and, therefore, preferably, the distance may be set such that ξ≧0.1 Da.

Figure 5:
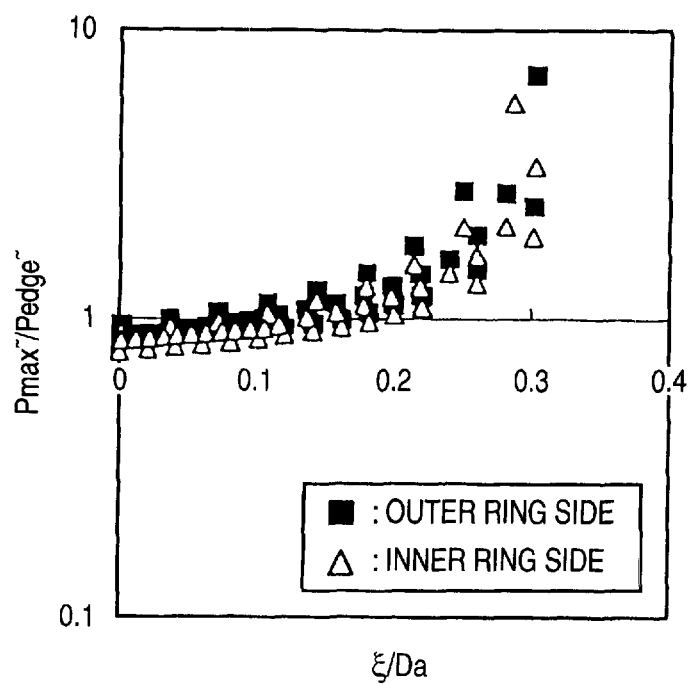
FIG. 5 is a graphical representation of the relationship between $P_{max}/P_{edge}$ and ξ/Da of the contact portion.

Also, in case where the distance is set such that ξ<0.1 Da, an edge load can occur frequently and thus, as shown in FIG. 5, the surface pressure $P_{edge}$, which is applied to the end portion of the contact portion 18, is larger than the surface pressure $P_{max}$ that is applied to the central portion of the contact portion 18. On the other hand, in case where the distance is equal to or larger than 0.1 Da, $P_{max}$ is greater than $P_{edge}$. And, in case where the distance is equal to or larger than 0.3 Da, $P_{edge}$ provides a value near to 0, so that seizure caused by the run off of the contact portion can hardly occur. Therefore, in case where the distance is set such that ξ≧0.1 Da, the surface pressure $P_{max}$ applied to the central portion of the contact portion 18 is greater than the surface pressure $P_{edge}$ applied to the end portion of the contact portion 18, thereby being able to restrict occurrence of seizure due to an increase in the surface pressure.

By the way, it is known that, in case where a film thickness ratio (an oil film parameter) in the contact portion between the contact portion of the roller end 17 and flange portion 14 decreases, a rate of metal contact increases, thereby increasing a possibility that seizure and wear can occur. Here, when the oil film thickness of the contact portion is expressed as $h_{min}$, the minimum oil film thickness $H_{min}$ of the contact portion according to the EHL theory "Elasto-Hydrodynamic Lubrication theory" can be expressed by the following equation (1).

$$H_{min} = h_{min} / Rx \qquad (1)$$

$$= 3.63 \times U^{0.68} \times G^{0.49} \times W^{-0.079} \times \{1 - \exp(-0.68\,k)\}$$

where U=$\eta_0$×u/(E×Rx): speed parameter, G=α×E: material parameter, W=w/(E×Rx$^2$): load parameter, Rx: effective radius (circumferential-direction local radius of curvature of flange portion and roller end face when viewed from bearing side) in a surface on the x axis (motion-direction coordinate), $\eta_0$: viscosity of lubricating oil under the atmospheric pressure, E: effective elastic modulus of cylindrical roller and flange portion, α: pressure-viscosity coefficient (characteristic of lubricating oil), u: u=($u_1$+$u_2$)/2 $u_1$, $u_2$: surface velocity, w: axial load, k: contact portion aspect ratio.

Figure 6:
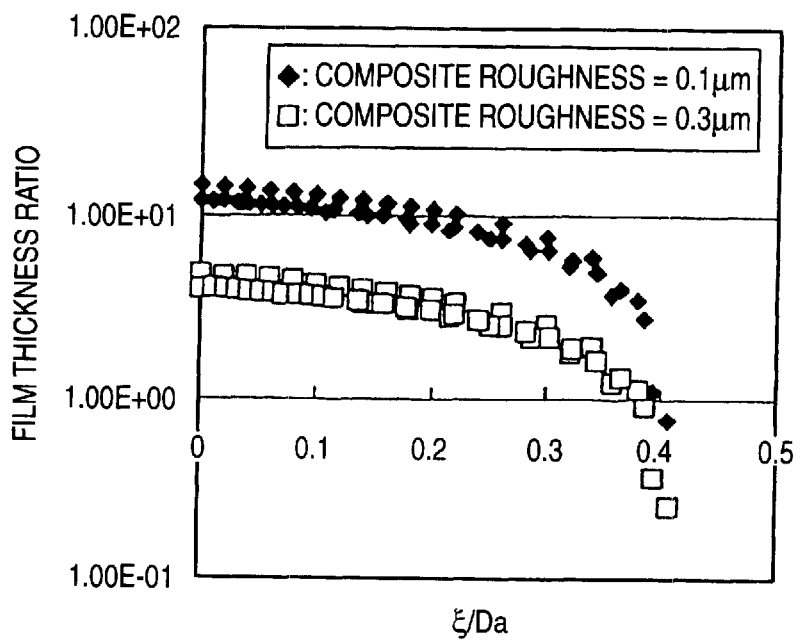
FIG. 6 is a graphical representation of the relationship between the film thickness ratio and ξ/Da of the contact portion.

Also, where the surface roughness of the contact portion of the roller end 17 is expressed as $\sigma_1$, the surface roughness of the flange portion 14 as $\sigma_2$, the composite roughness of the contact portion between the contact portion of the roller end 17 and flange portion 14 as σ, and the oil film thickness of the contact portion between the contact portion of the roller end 17 and flange portion 14 as $h_{min}$, the film thickness ratio Λ of the contact portion between the contact portion of the roller end 17 and flange portion 14 can be expressed by the following equation (3).

$$\sigma = \sqrt{(\sigma_1^2 + \sigma_2^2)} \quad (2)$$
$$\Lambda = h_{min}/\sigma \quad (3)$$

Where the composite roughness of the contact portion between the contact portion of the roller end 17 and flange portion 14 is 0.1 μm and 0.3 μm and the lubricating oil viscosity is 4.8 cSt (mm²/s), the relationship between the film thickness ratio Λ and ξ/Da is analyzed by calculation, while the analysis results are shown in FIG. 6. As can be seen from FIG. 6, in case where the value of ξ/Da exceeds 0.4, the film thickness ratio Λ decreases and thus the rate of metal contact increases. Therefore, the distance ξ may be preferably set equal to or less than 0.4 Da and, more preferably, it may be set in the range of 0.1 Da to 0.4 Da.

Also, as can be seen from FIG. 6, when ξ/Da is of the order of 0.3, in case where the composite roughness σ of the contact portion of the roller end 17 and flange portion 14 exceeds 0.6 μm, formation of an oil film is difficult. When ξ/Da is of the order of 0.1, in case where the composite roughness σ, of the contact portion of the roller end 17 and flange portion 14 exceeds 1 μm, the oil film parameter is equal to or less than 1, which makes it difficult to form the oil film.

Figure 7:
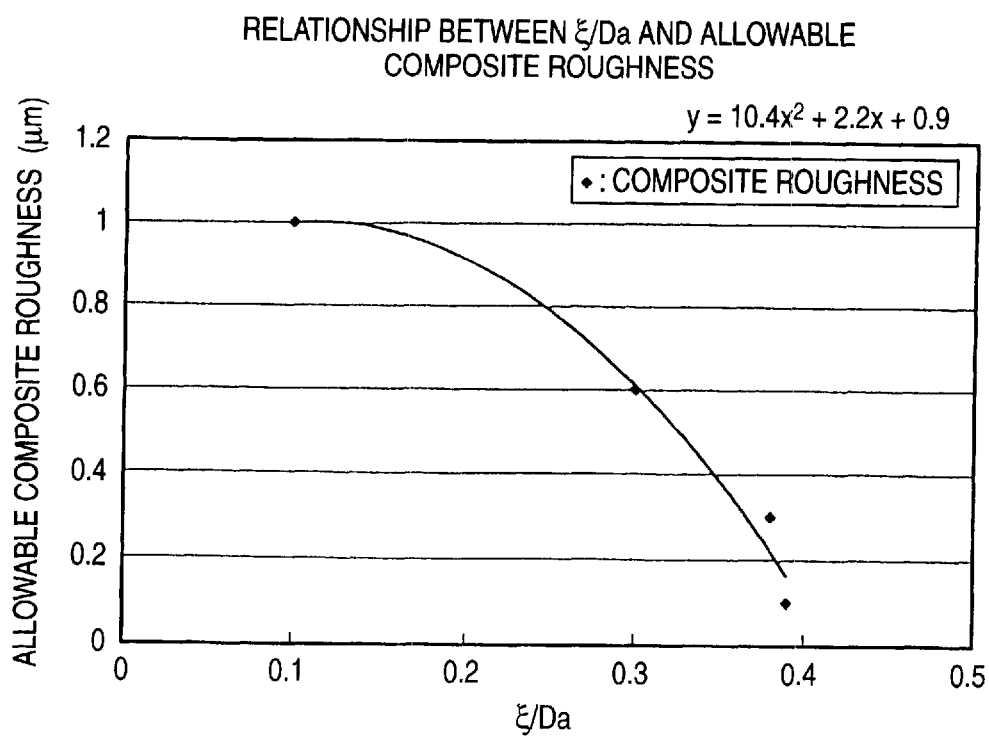
FIG. 7 is a graphical representation of the relationship between the composite roughness and ξ/Da of the contact portion.

Now, FIG. 7 shows the results that are obtained, when the relationship between the composite roughness σ and ξ/Da, when the film thickness ratio Λ is 1, is analyzed by calculation. As can be seen from FIG. 7, when ξ/Da is in the range of 0.1 to 0.4, in order that the film thickness ratio Λ can be equal to 1, the composite roughness σ of the contact portion may be set such that σ=−10.4 (ξ/Da)²+2.2 (ξ/Da)+0.9. Therefore, when ξ/Da is in the range of 0.1 to 0.4, preferably, the composite roughness σ, of the contact portion of the roller end 17 and flange portion 14 may be set such that σ≦−10.4 (ξ/Da)²+2.2 (ξ/Da)+0.9.

Figure 8:
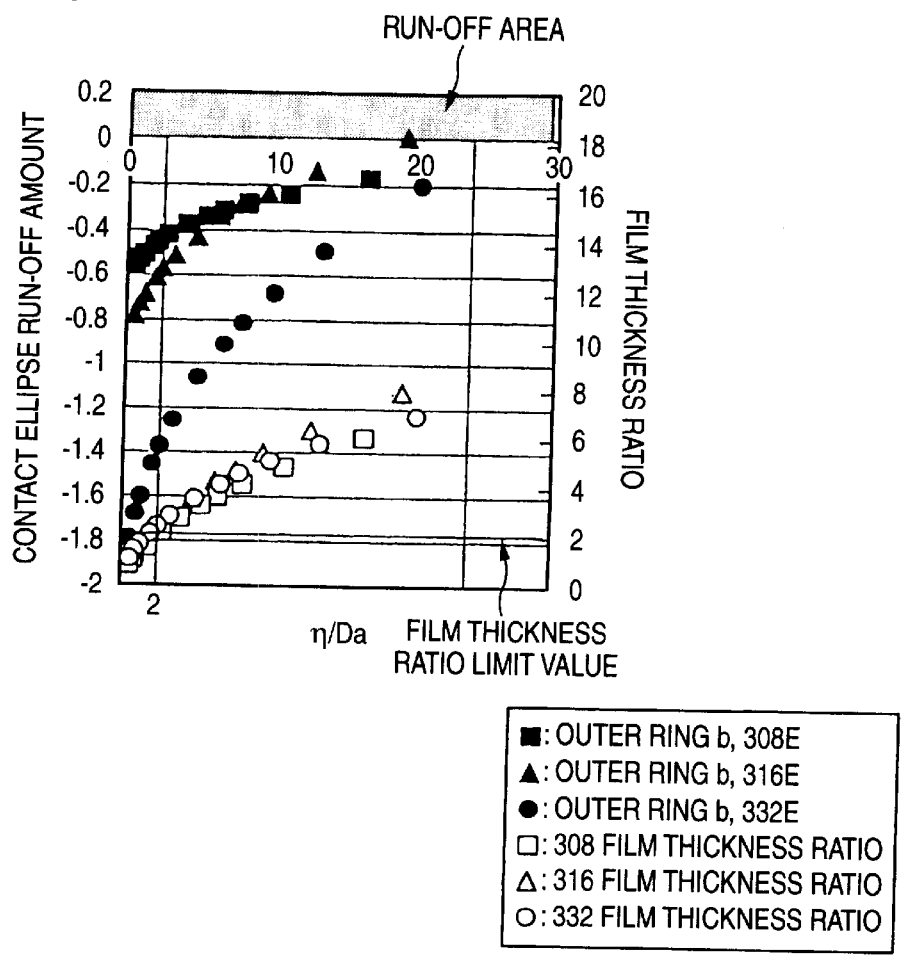
FIG. 8 is a graphical representation of the relationship between η/Da and the contact portion swelling amount and film thickness ratio where ξ/Da=0.35.
Figure 9:
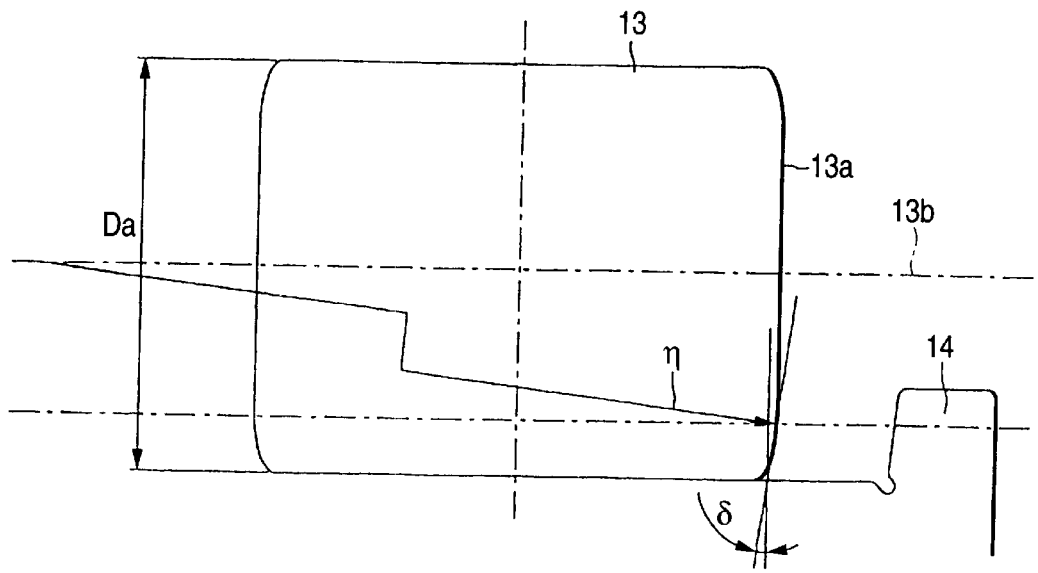
FIG. 9 is a view of a portion of a conventional radial roller bearing.
Figure 10:
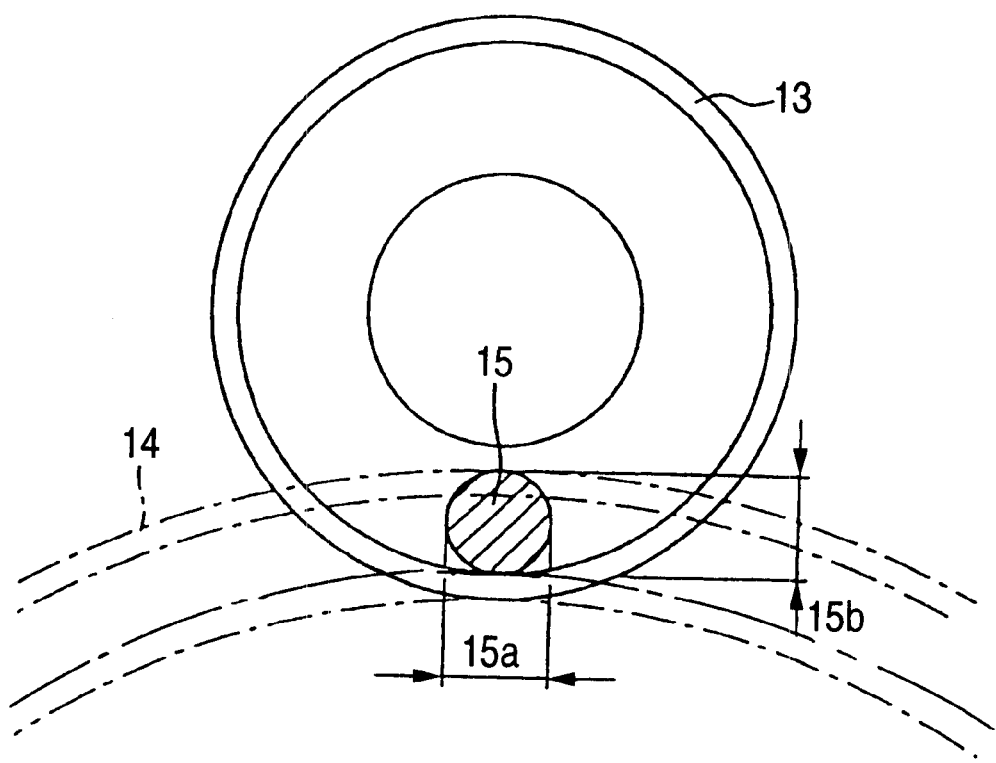
FIG. 10 is a view of the portion of FIG. 9 where a cylindrical roller and a flange portion are contacted with each other.

Next, FIG. 8 shows the results that are obtained when the relationship between η/Da, contact portion run-off amount, and film thickness ratio in case where an axial load is applied to three kinds (NJ 308 (bore diameter: di=40 mm, outside diameter: do=90 mm, width: w=23 mm), NJ 316 (di=80 mm, do=170 mm, w=39 mm), NJ 332 (di=160 mm, do=340 mm, w=68 mm)) of radial roller bearings (for each of them, ξ/Da=0.35) is analyzed by calculation. As can be seen from FIG. 8, in case where the radius of curvature η increases as the flange portion opening angle δ decreases, the run-off amount of the contact portion 18 and the film thickness ratio Λ of the contact portion 18 respectively increase. Also, in case where the limit value of the film thickness ratio Λ is set for 2, preferably, η/Da may be equal to or larger than 2 and, further, in case where η/Da is set equal to or smaller than 20, the contact portion does not reach the run off area. Therefore, in order to restrict the seizure and wear of the contact portion, preferably, η/Da may be set such that η/Da=2 to 20.

Two radial roller bearings, which are different in the shape of the contact portion between the cylindrical roller 13 and flange portion 14 from each other, were used as bearing samples. An seizure resistance test was conducted on the two bearing samples under the test condition, that is, at the rotation speed of 5150 rpm. The results of the test are shown in Table 1.

|   | Radial load, N(kgf) | Axial load, N(kgf) | Rotation speed, mm⁻¹ (rpm) | Aspect ratio | Run-off rate, (%) | Test results |
|---|---|---|---|---|---|---|
| 1 | 15974 (1630) | 13328 (1360) | 5150 | 0.876081 | 56.77233 | GOOD |
|   | 7350 (750) | 14700 (1500) | 5150 | 0.875776 | 73.75776 | NO GOOD (seizure) |
|   | 7350 (750) | 19600 (2000) | 5150 | 0.87574 | 77.07101 | NO GOOD (seizure) |
|   | 15974 (1630) | 13328 (1360) | 5150 | 3.898305 | −200 | GOOD |
| 2 | 7350 (750) | 14700 (1500) | 5150 | 3.903846 | −233.654 | GOOD |
|   | 7350 (750) | 19600 (2000) | 5150 | 3.872727 | −218.182 | GOOD |

In run-off rate (%) of Table 1, positive values show run off rate.

In Table 1, a sample No. 1 shows a bearing sample in which the aspect ratio k of the contact portion is of the order of 0.8, while a sample No. 2 shows a bearing sample in which the aspect ratio k of the contact portion is of the order of 3.8. By the way, where the radii of curvature of the vicinities of the contact points are expressed as Ry, Rx, the aspect ratio k can be obtained by the following equation (4).

$$k \approx 1.0339 \times (Ry/Rx)^{0.636} \quad (4)$$

As can be seen from the test results shown in Table 1, in the case of the bearing sample used as the sample No. 1, under the load condition of the radial load of 15974 N (1630 kgf) and axial load of 13328 N (1360 kgf), occurrence of seizure was not confirmed; but, under the load condition of the radial load of 7350 N (750 kgf) and axial load of 14700 N (1500 kgf) and 19600 N (2000 kgf), occurrence of seizure was confirmed. On the other hand, in the case of the bearing sample used as the sample No. 2, occurrence of seizure was confirmed under neither of the above-mentioned two load conditions.

Therefore, can be seen clearly from the test results shown in Table 1 as well, in case where the radius of curvature η of a circular ring portion formed in the end face 13a of the cylindrical roller 13 is set such that η=2.0 Da to 20.0 Da and the distance ξ from the center of the radius of curvature η to the rotation axis 13b of the cylindrical roller 13 along the radial direction of the cylindrical roller is set such that ξ=0.1 Da to 0.4 Da, the contact portion between the cylindrical roller 13 and flange portion 14 provides such a shape that is difficult to run off from the flange portion 14. This can restrict occurrence of an edge load in the contact portion between the cylindrical roller 13 and flange portion 14, thereby being able to enhance the seizure resistance and wear resistance of the radial roller bearing.

As has been described heretofore, according to a radial roller bearing of the invention, since the contact portion between the cylindrical roller and flange portion provides a shape which is difficult to run off from the flange portion, occurrence of an edge load in the contact portion between the cylindrical roller 13 and flange portion 14 can be restricted, so that the seizure resistance and wear resistance of the radial roller bearing can be enhanced.

What is claimed is:

1. A radial roller bearing, comprising:

an outer ring;

an inner ring; and, a cylindrical roller interposed between the outer ring and the inner ring, the outer and inner rings respectively including flange portions formed in the end portions thereof so as to be opposed to the end face of the cylindrical roller, wherein, in the end face of the cylindrical roller, there is formed a circular-ring-shaped contact portion of the roller end having centers of curvature continuously existing on a circle which lies on a plane parallel to the end face of the cylindrical roller and also the center of the circle is on the rotation axis of the cylindrical roller.

2. A radial roller bearing as set forth in claim 1, wherein, where the distance from the center of curvature of the contact portion of the roller end to the rotation axis of the cylindrical roller along the radial direction of the cylindrical roller is expressed as ξ and the diameter of the cylindrical roller is expressed as Da, the distance is set that ξ=0.1 Da to 0.4 Da.

3. A radial roller bearing as set forth in claim 2, wherein, where the distance from the center of curvature of the contact portion of the roller end to the rotation axis of the cylindrical roller along the radial direction of the cylindrical roller is expressed as ξ, the diameter of the cylindrical roller is expressed as Da and the composite roughness of the contact portion between the contact portion of the roller end and the flange portion is expressed as σ, the composite roughness is set that $\sigma \leq -10.4\ (\xi/Da)^2 + 2.2\ (\xi/Da) + 0.9$.

4. A radial roller bearing as set forth in claim 3, wherein, where the radius of curvature of the contact portion of the roller end is expressed as η and the diameter of the cylindrical roller is expressed as Da, the radius of curvature is set that η=2.0 Da to 20.0 Da.

5. A radial roller bearing as set forth in claim 2, wherein, where the radius of curvature of the contact portion of the roller end is expressed as η and the diameter of the cylindrical roller is expressed as Da, the radius of curvature is set that η=2.0 Da to 20.0 Da.

* * * * *